(12) United States Patent
Rissler

(10) Patent No.: US 10,247,429 B2
(45) Date of Patent: Apr. 2, 2019

(54) SYSTEM AND METHOD FOR DETERMINING THE POSITION OF A VENT DOOR OF A PACKAGED TERMINAL AIR CONDITIONER UNIT

(71) Applicant: Haier US Appliance Solutions, Inc., Wilmington, DE (US)

(72) Inventor: Christopher Bryan Rissler, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 120 days.

(21) Appl. No.: 15/598,354

(22) Filed: May 18, 2017

(65) Prior Publication Data

US 2018/0335223 A1 Nov. 22, 2018

(51) Int. Cl.
| | |
|---|---|
| *F24F 1/02* | (2011.01) |
| *F24F 1/027* | (2019.01) |
| *F24F 11/77* | (2018.01) |
| *F24F 11/30* | (2018.01) |
| F24F 11/52 | (2018.01) |
| F24F 140/40 | (2018.01) |
| F24F 110/00 | (2018.01) |

(52) U.S. Cl.
CPC .............. *F24F 1/027* (2013.01); *F24F 11/30* (2018.01); *F24F 11/77* (2018.01); *F24F 11/52* (2018.01); *F24F 2110/00* (2018.01); *F24F 2140/40* (2018.01)

(58) Field of Classification Search
CPC .... F24F 1/027; F24F 1/022; F24F 1/02; F24F 11/0001; F24F 2011/0004; F24F 11/32; F24F 11/30; F24F 13/10; F24F 13/20; F24F 2011/0002; F24F 2001/0051; F24F 2007/003; F24F 2110/10; F24F 2110/12; F24F 2110/20; F24F 2110/22
USPC ............ 62/498, 90, 409, 411, 412; 454/228, 454/229–230, 234–236
See application file for complete search history.

(56) References Cited

U.S. PATENT DOCUMENTS

| | | | |
|---|---|---|---|
| 2,768,514 | A | 10/1956 | McGrath |
| 3,021,696 | A | 2/1962 | Spiegelhalter |
| 5,933,085 | A | 8/1999 | Holcomb et al. |
| 6,916,239 | B2 | 7/2005 | Siddaramanna et al. |
| 8,160,749 | B2 | 4/2012 | Donaldson et al. |
| 2006/0152336 | A1 | 7/2006 | Turkovich, Jr. et al. |
| 2011/0097988 | A1 | 4/2011 | Lord |
| 2014/0216259 | A1* | 8/2014 | Iwaki ...................... F24F 3/166 96/19 |
| 2016/0313014 | A1* | 10/2016 | Phillips ................... F24F 13/20 |
| 2017/0115014 | A1* | 4/2017 | Junge .................... F24F 3/1405 |

* cited by examiner

*Primary Examiner* — Steven B McAllister
*Assistant Examiner* — Ko-Wei Lin
(74) *Attorney, Agent, or Firm* — Dority & Manning, P.A.

(57) ABSTRACT

A packaged terminal air conditioner unit (PTAC) and methods for operating the same are provided. The PTAC includes an auxiliary fan configured for urging a flow of make-up air from the outdoor portion into the indoor portion through a vent aperture defined by a bulkhead. A vent door is positioned proximate the vent aperture and is operatively coupled with a reed switch assembly. A controller is configured for stopping the operation of the auxiliary fan when the reed switch assembly detects that the vent door is in the closed position.

20 Claims, 8 Drawing Sheets

SYSTEM AND METHOD FOR DETERMINING THE POSITION OF A VENT DOOR OF A PACKAGED TERMINAL AIR CONDITIONER UNIT

FIELD OF THE INVENTION

The present disclosure relates generally to air conditioner units, and more particularly to packaged terminal air conditioner units and related methods of operation.

BACKGROUND OF THE INVENTION

Air conditioner or conditioning units are conventionally utilized to adjust the temperature indoors—i.e. within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected, by e.g., tubing carrying the refrigerant, to another portion located outdoors. These types of units are typically used for conditioning the air in larger spaces.

Another type of unit, sometimes referred to as a packaged terminal air conditioner unit (PTAC), may be used for somewhat smaller indoor spaces that are to be air conditioned. These units may include both an indoor portion and an outdoor portion separated by a bulkhead and may be installed in windows or positioned within an opening of an exterior wall of a building. PTACs often need to draw air from the outdoor portion into the indoor portion. For example, if a bathroom fan is turned on or air is otherwise ejected from the indoor space, fresh air may be required to supplement or make-up for the lost air.

Accordingly, certain PTACs allow for the introduction of make-up air into the indoor space, e.g., through a vent aperture defined in the bulkhead that separates the indoor and outdoor side of the unit. The vent aperture is usually equipped with an auxiliary fan and/or make-up air module to urge a flow of make-up air from the outdoor side of the PTAC into the conditioned room. In addition, a motorized vent door is pivotally mounted over the vent aperture to control the flow of make-up air.

However, in certain situations, the vent door may not operate properly, e.g., due to an electrical fault or a physical obstruction, resulting in undesirable operating conditions. For example, if the vent door becomes stuck in the closed position, proper make-up air flow will not be supplied to the room and the auxiliary fan may be stressed in trying to supply the necessary make-up air. By contrast, if the vent door becomes stuck in the open position, outside air will seep into the room, resulting in heat loss in the winter, cool air loss in the summer, and excessive noise from the outdoors when the PTAC is not operating.

Accordingly, improved air conditioner units and associated methods for detecting the position of the vent door would be useful. More specifically, packaged terminal air conditioner units and associated methods of operation that can detect the vent door position and adjust system operation accordingly would be particularly beneficial.

BRIEF DESCRIPTION OF THE INVENTION

The present subject matter provides a packaged terminal air conditioner unit (PTAC) and methods for operating the same. The PTAC includes an auxiliary fan configured for urging a flow of make-up air from the outdoor portion into the indoor portion through a vent aperture defined by a bulkhead. A vent door is positioned proximate the vent aperture and is operatively coupled with a reed switch assembly. A controller is configured for stopping the operation of the auxiliary fan when the reed switch assembly detects that the vent door is in the closed position. Additional aspects and advantages of the invention will be set forth in part in the following description, may be obvious from the description, or may be learned through practice of the invention.

In accordance with one embodiment, a packaged terminal air conditioner unit is provided. The packaged terminal air conditioner unit includes a bulkhead defining an indoor portion and an outdoor portion, a vent aperture defined in the bulkhead, and an auxiliary fan positioned proximate the vent aperture and being configured for urging a flow of make-up air from the outdoor portion through the vent aperture to the indoor portion. A vent door is positioned proximate the vent aperture, the vent door being pivotable between an open position for allowing the flow of make-up air through the vent aperture and a closed position for blocking the flow of make-up air through the vent aperture. A switch assembly is operably coupled to the vent door for detecting whether the vent door is in the open position or the closed position. A controller is operably coupled to the auxiliary fan and the switch assembly, the controller being configured for stopping the operation of the auxiliary fan when the switch assembly detects that the vent door is in the closed position.

In accordance with another embodiment, a control circuit for a packaged terminal air conditioner unit is provided. The packaged terminal conditioner unit includes a vent door being pivotally mounted over a vent aperture defined in a bulkhead of the packaged terminal air conditioner unit and being movable between an open position and a closed position. The control circuit includes an auxiliary fan positioned proximate the vent aperture and being configured for urging a flow of make-up air from the outdoor portion through the vent aperture. A controller is operatively connected to the auxiliary fan and configured for providing a flow of electrical power to the auxiliary fan. A switch assembly is connected in series between the controller and the auxiliary fan. The switch assembly includes a reed switch positioned on the bulkhead adjacent the vent aperture and a magnet positioned on the vent door and configured to open the reed switch when the vent door is in the closed position to interrupt the flow of electrical power to the auxiliary fan.

In accordance with still another embodiment, a method for controlling an auxiliary fan of a packaged terminal air conditioner unit is provided. The packaged terminal conditioner unit includes a vent door being pivotally mounted over a vent aperture defined in a bulkhead of the packaged terminal air conditioner unit and being movable between an open position and a closed position. The method includes operating the auxiliary fan to urge a flow of make-up air through the vent aperture, detecting an interruption in a flow of electrical power to the auxiliary fan, the interruption resulting from a switch assembly breaking the flow of electrical power when the vent door is in the closed position, and stopping the auxiliary fan in response to detecting an interruption in the flow of electrical power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
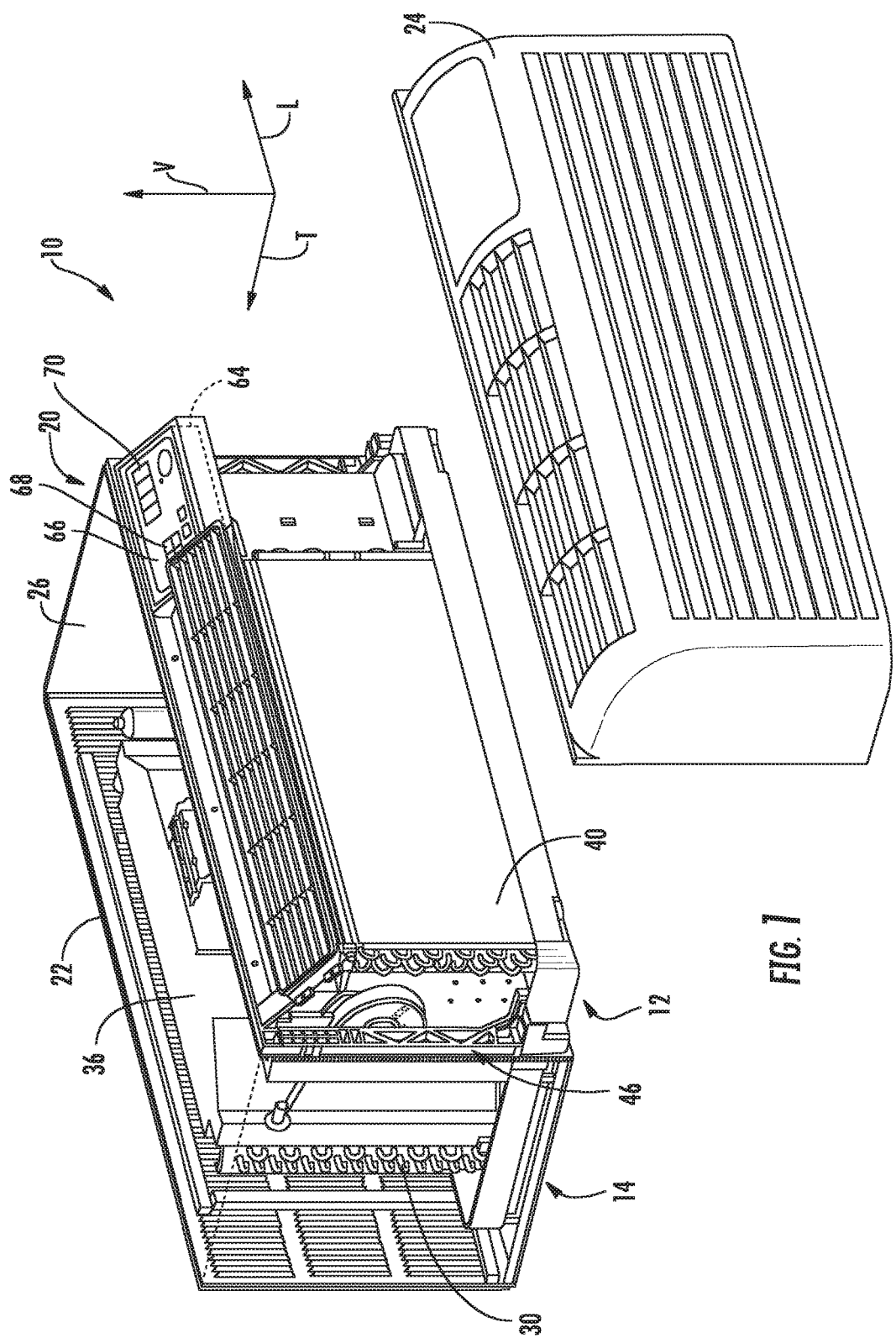
FIG. 1 provides a perspective view of an air conditioner unit, with part of an indoor portion exploded from a remainder of the air conditioner unit for illustrative purposes, in accordance with one exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32 (FIG. 2), and a compressor 34 (FIG. 2) may be housed within the wall sleeve 26. A casing 36 may additionally enclose outdoor fan 32, as shown.

Figure 2:
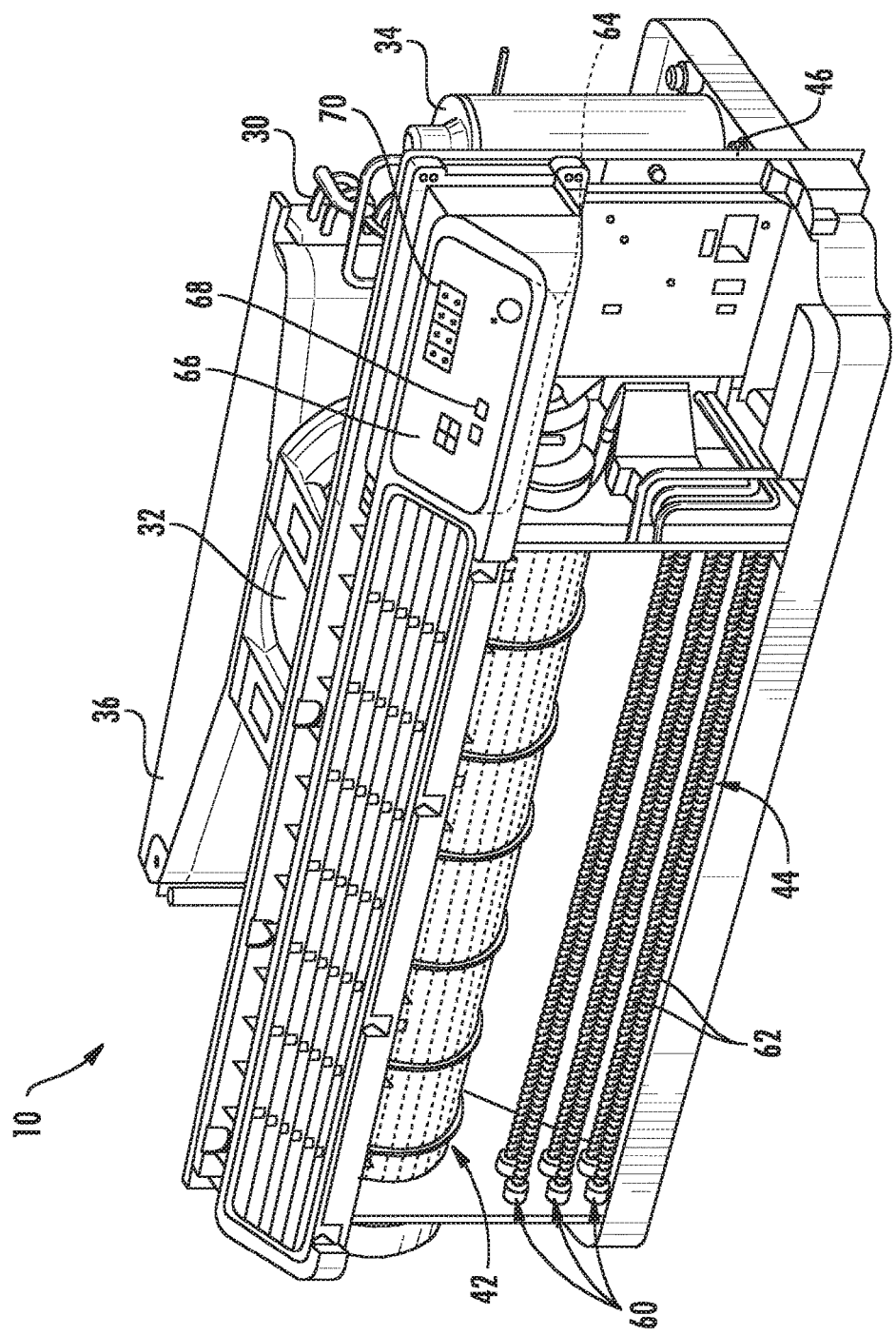
FIG. 2 is another perspective view of components of the indoor portion of the exemplary air conditioner unit of FIG. 1.

Referring now also to FIG. 2, indoor portion 12 may include, for example, an indoor heat exchanger 40 (FIG. 1), a blower fan 42, and a heating unit 44. These components may, for example, be housed behind the room front 24. Additionally, a bulkhead 46 may generally support and/or house various other components or portions thereof of the indoor portion 12, such as the blower fan 42 and the heating unit 44. Bulkhead 46 may generally separate and define the indoor portion 12 and outdoor portion 14.

Figure 3:
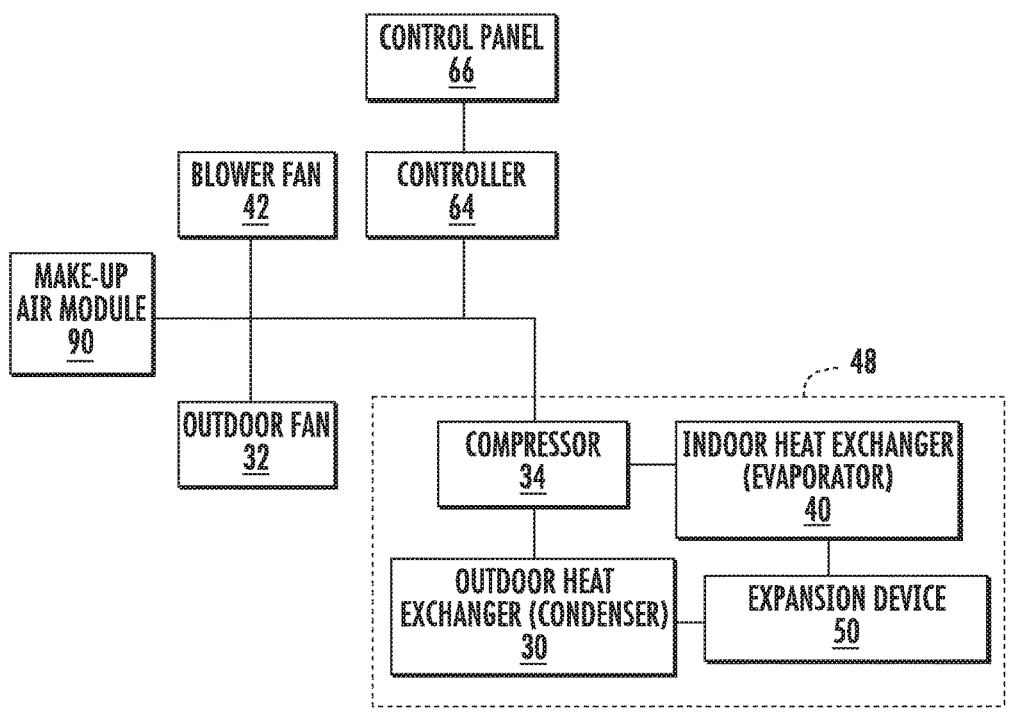
FIG. 3 is a schematic view of a refrigeration loop in accordance with one embodiment of the present disclosure.

Outdoor and indoor heat exchangers 30, 40 may be components of a refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such example and rather that any suitable refrigerant may be utilized.

As is understood in the art, refrigeration loop 48 may be alternately be operated as a refrigeration assembly (and thus perform a refrigeration cycle) or a heat pump (and thus perform a heat pump cycle). As shown in FIG. 3, when refrigeration loop 48 is operating in a cooling mode and thus performs a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

According to the illustrated exemplary embodiment, outdoor fan 32 is an axial fan and indoor blower fan 42 is a centrifugal fan. However, it should be appreciated that according to alternative embodiments, outdoor fan 32 and blower fan 42 may be any suitable fan type. In addition, according to an exemplary embodiment, outdoor fan 32 and blower fan 42 are variable speed fans. For example, outdoor fan 32 and blower fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, blower fan 42 may operate as an evaporator fan in refrigeration loop 48 to encourage the flow of air through indoor heat exchanger 40. Accordingly, blower fan 42 may be positioned downstream of indoor heat exchanger 40 along the flow direction of indoor air and downstream of heating unit 44. Alternatively, blower fan 42 may be positioned upstream of indoor heat exchanger 40 along the flow direction of indoor air, and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) blower fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66, and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
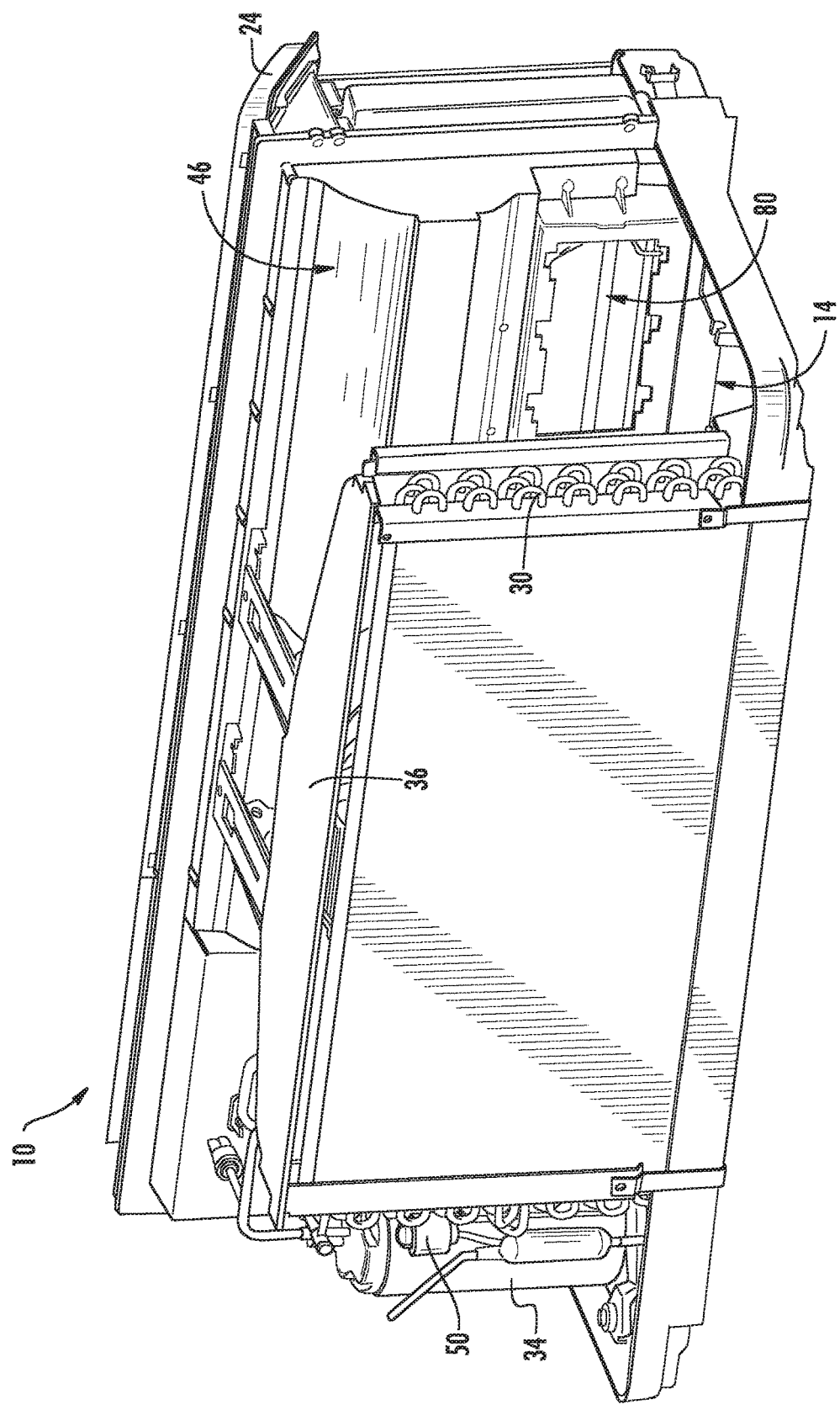
FIG. 4 is a rear perspective view of an outdoor portion of the exemplary air conditioner unit of FIG. 1, illustrating a vent aperture in a bulkhead assembly in accordance with one embodiment of the present disclosure.

Referring briefly to FIG. 4, a vent aperture 80 may be defined in bulkhead 46 providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, or to compensate for negative pressure created within the room. In this manner, according to an exemplary embodiment, make-up air may be provided into the room through vent aperture 80 when desired.

Figure 5:
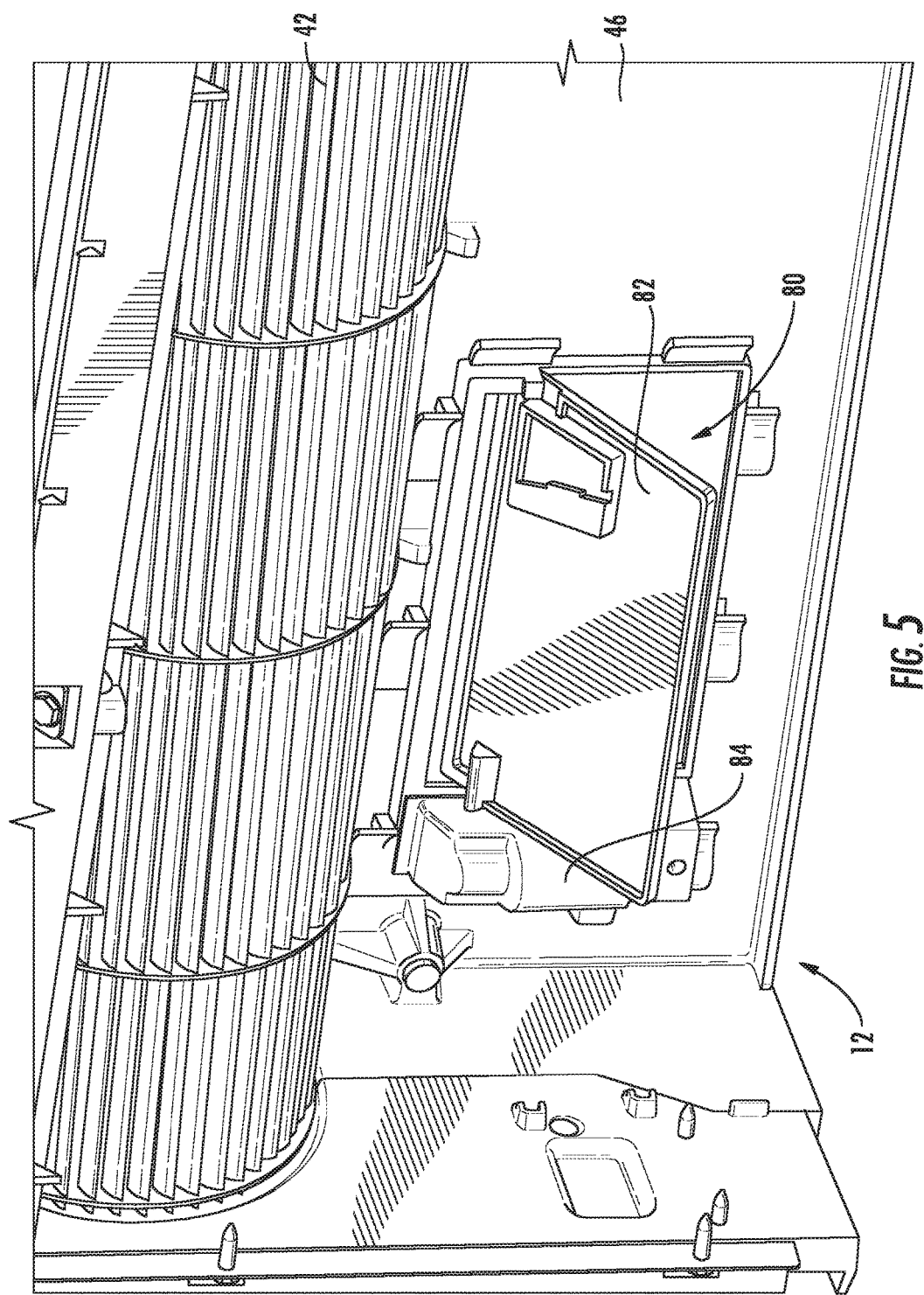
FIG. 5 is a front perspective view of the exemplary bulkhead assembly of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

Figure 6:
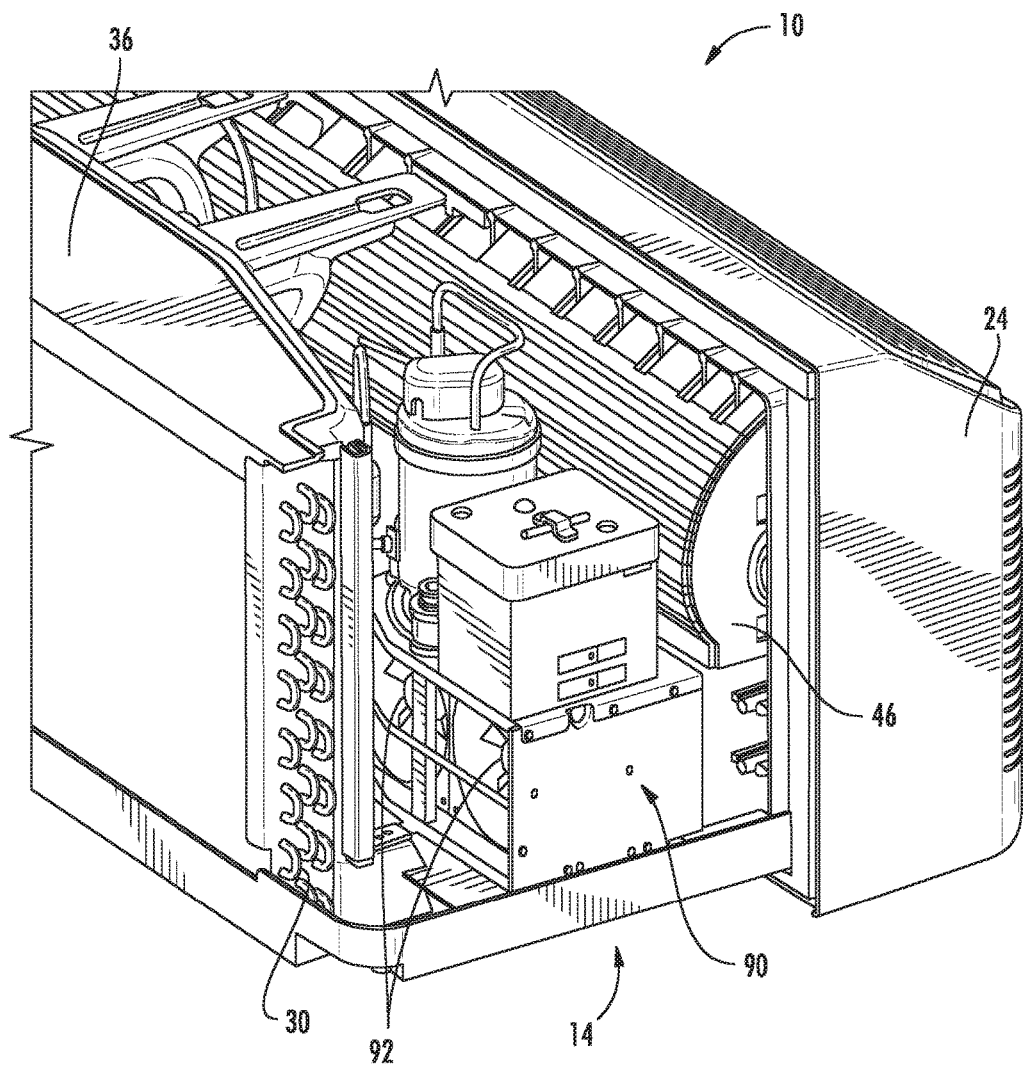
FIG. 6 is a rear perspective view of the exemplary air conditioner unit and bulkhead assembly of FIG. 4 including a sealed system for conditioning make-up air in accordance with one embodiment of the present disclosure.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, as illustrated in FIG. 6, unit 10 may further include an auxiliary sealed system, or make-up air module 90, for conditioning make-up air. As shown, make-up air module 90 and/or an auxiliary fan 92 are positioned within outdoor portion 14 adjacent vent aperture 80 and vent door 82 is positioned within indoor portion 12 over vent aperture 80, though other configurations are possible. According to the illustrated embodiment auxiliary sealed system 90 may be controlled by controller 64, by another dedicated controller, or by any other suitable method.

As illustrated, make-up air module 90 includes auxiliary fan 92 that is configured as part of auxiliary sealed system 90 and may be configured for urging a flow of air through auxiliary sealed system 90. Auxiliary sealed system 90 may further includes one or more compressors, heat exchangers, and any other components suitable for operating auxiliary sealed system 90 similar to refrigeration loop 48 described above to condition make-up air. For example, auxiliary system 90 can be operated in a dehumidification mode, an air conditioning mode, a heating mode, a fan only mode where only auxiliary fan 92 is operated to supply outdoor air, an idle mode, etc.

Figure 7:
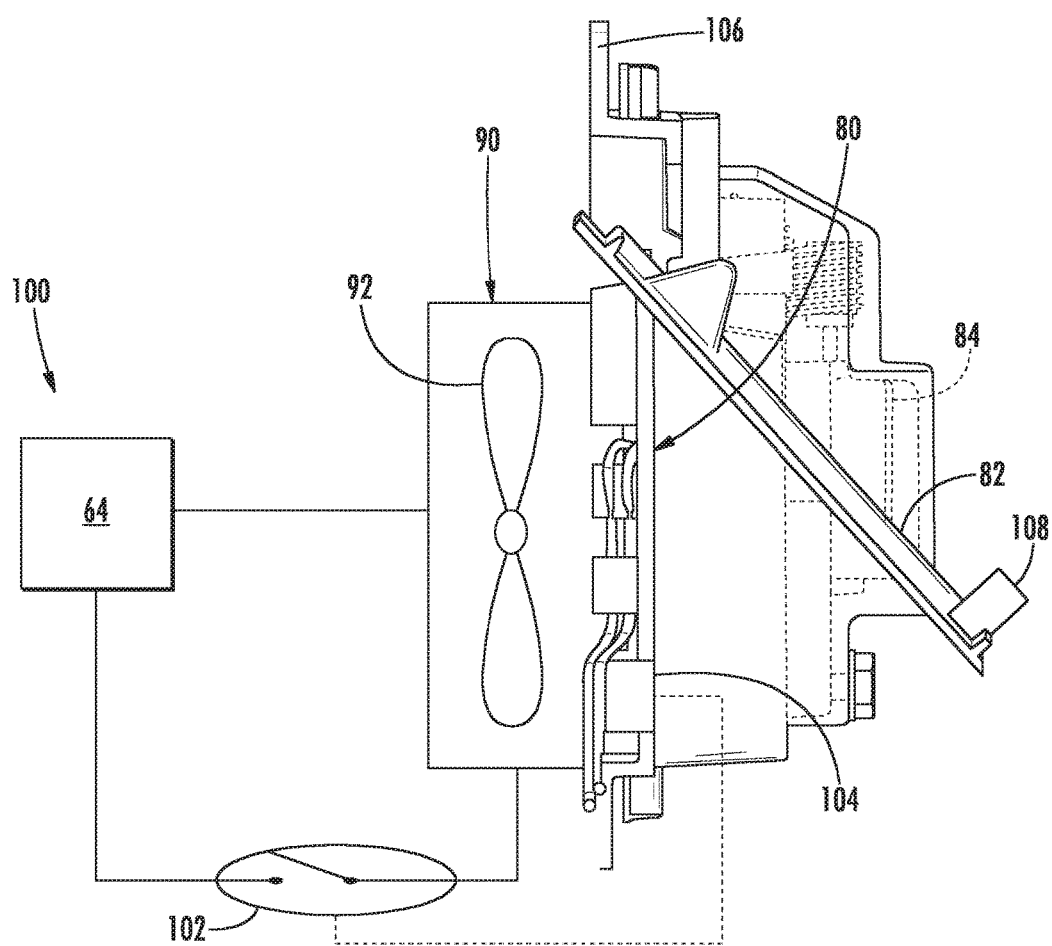
FIG. 7 is a schematic view of a control circuit used to operate an auxiliary fan of the exemplary air conditioner unit of FIG. 1 according to an exemplary embodiment of the present subject matter.

Referring now to FIG. 7, a control circuit 100 used to operate auxiliary fan 92 and/or make-up air module 90 is described according to an exemplary embodiment. In general, control circuit 100 is used to stop the operation of auxiliary fan 92 and provide a fault indication to a user of unit 10 if vent door 82 experiences a malfunction, as described below. Although control circuit 100 is described herein as one exemplary configuration for operatively coupling auxiliary fan 92 and vent door 82, it should be appreciated that other configurations are possible while remaining within the scope of the present subject matter.

As illustrated in FIG. 7, control circuit 100 generally includes controller 64, auxiliary fan 92, and a switch assembly 102 electrically connected in series. Switch assembly 102 is operably coupled to vent door 82 for detecting whether vent door 82 is in the open position or the closed position. More specifically, as illustrated, switch assembly 102 is a reed switch assembly including a reed switch 104 positioned on a vent door frame 106 positioned on bulkhead 46 adjacent vent aperture 80 and a magnet 108 positioned on vent door 82 and configured to open reed switch 104 when vent door 82 is in the closed position. In this regard, switch assembly 102 is a normally closed switch that maintains electrical continuity between auxiliary fan 92 and controller 64 when vent door 82 is in the open position. By contrast, when vent door 82 is closed, magnet 108 opens reed switch 104 of switch assembly 102 and breaks the electrical continuity of control circuit 100, thereby stopping the flow of electrical power to auxiliary fan 92. In this manner, control circuit 100 operates to allow auxiliary fan 92 to run only when vent door 82 is in the open position.

In addition, controller 64 may communicate with auxiliary fan 92 to power auxiliary fan 92 and send a signal for controlling the speed of auxiliary fan 92. Controller 64 then receives feedback from auxiliary fan 92 as to what the actual fan speed is and continually monitors the fan speed. Notably, if controller 64 is sending a signal for auxiliary fan 92 to rotate at a specific speed and the feedback is zero (indicating auxiliary fan 92 is not rotating), controller 64 recognizes the error as either a failure of auxiliary fan 92 or vent door 82, and may act accordingly.

According to an alternative embodiment, controller 64 can be directly communicatively coupled to reed switch to detect when the electrical continuity of control circuit 100 is broken and provide a suitable error or fault indication to a user of unit 10 or a facility administrator when auxiliary fan 92 is stopped because vent door 82 is in the closed position. Such a fault indication may be provided using any suitable means. According to the exemplary embodiment, the error indication is provided on display 70 of packaged terminal air conditioner unit 10.

According to an alternative embodiment of the present subject matter, controller 64 may be communicatively coupled to switch assembly 102 for monitoring the position of vent door 82. In this manner, for example, switch assembly 102 need not be incorporated as part of control circuit 100, but instead may be a direct means for monitoring the position of vent door 82. Thus, for example, if controller 64 determines that make-up air is needed, controller 64 can perform a control action to move vent door 82 to the open position and verify that vent door 82 is open before operating auxiliary fan 92 or sealed system 90. By contrast, if make-up air is not needed and vent door 82 should be closed to prevent undesired air flow through vent aperture 80, controller 64 may use switch assembly 102 to verify that vent door 82 is closed.

FIG. 7 describes one exemplary configuration of control circuit 100 for controlling the operation of auxiliary fan 92 for the purpose of explaining aspects of the present subject matter. However, it should be appreciated that although specific exemplary embodiments are described, modifications and variations may be made to the illustrated control circuit 100 while remaining within the scope of the present subject matter. For example, controller 64 of unit 10 is illustrated as part of control circuit 100 for controlling operation of auxiliary fan 92. However, according to alternative embodiments, control circuit 100 could include a dedicated controller, such as a dedicated make-up air module 90 controller. In addition, control circuit 100 could instead be connected directly to make-up air module 90, any other suitable type or configuration of switch assembly 102 may be used, and other circuit configurations are possible.

Now that the construction of air conditioner unit 10 and the configuration of control circuit 100 according to exemplary embodiments has been presented, an exemplary method 200 of controlling an auxiliary fan of a packaged terminal air conditioner unit will be described. Although the discussion below refers to the exemplary method 200 of operating air conditioner unit 10 using control circuit 100, one skilled in the art will appreciate that the exemplary method 200 is applicable to the operation of a variety of other air conditioning appliances using any suitable switch assembly or control circuit. In exemplary embodiments, the various method steps as disclosed herein may be performed by controller 64, although a dedicated controller may be used according to alternative embodiments.

Figure 8:
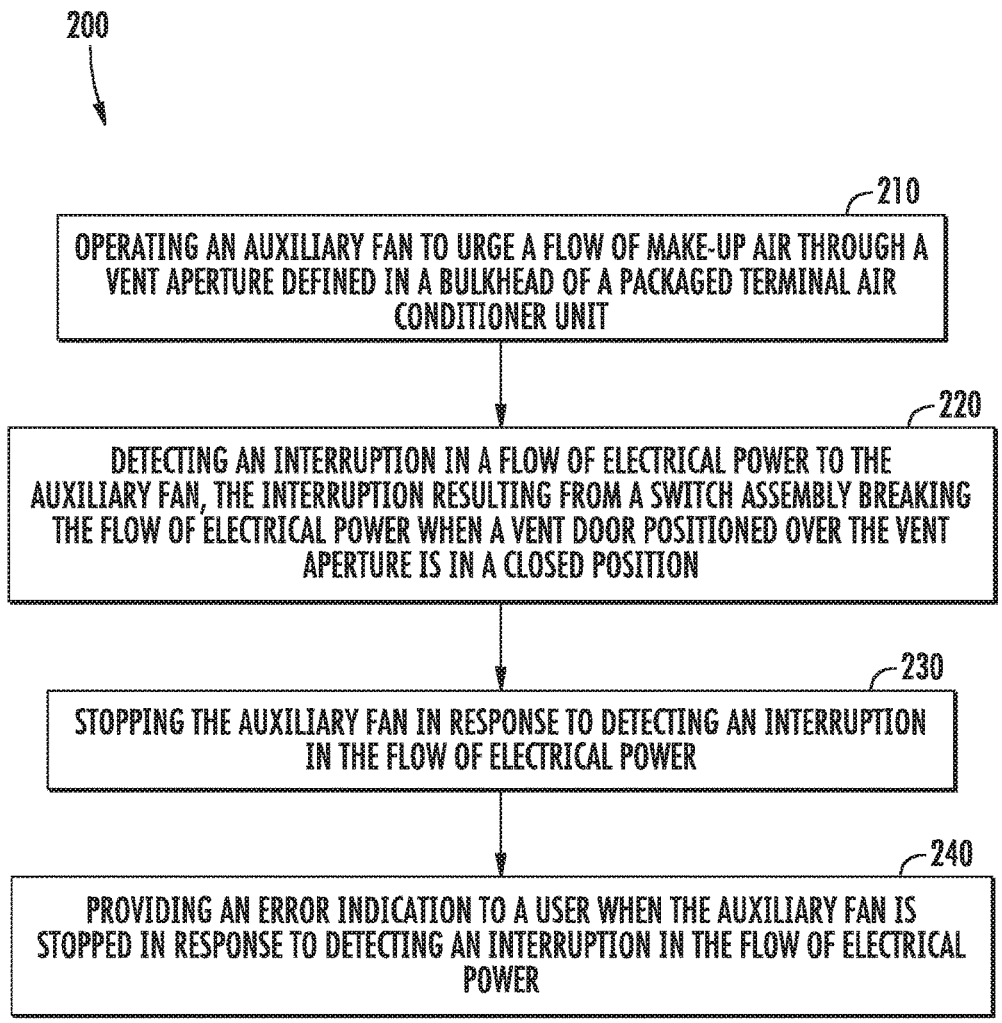
FIG. 8 illustrates a method for controlling an auxiliary fan of a packaged terminal air conditioner unit in accordance with one embodiment of the present disclosure.

Referring now to FIG. 8, method 200 includes, at step 210, operating an auxiliary fan to urge a flow of make-up air through a vent aperture defined in a bulkhead of a packaged terminal air conditioner unit. For example, the packaged terminal air conditioner unit may be unit 10 as described above. More specifically, a bulkhead may generally separate the indoor and outdoor portions of the unit and may define a vent aperture through which make-up air may be supplied. A vent door is pivotally mounted over the vent aperture and movable between an open position and a closed position to control the flow of make-up air. However, it should be appreciated that unit 10 is used herein for explanatory purposes only and that aspects of method 200 may be applied to any suitable air conditioner unit.

Method 200 further includes, at step 220, detecting an interruption in a flow of electrical power to the auxiliary fan, the interruption resulting from a switch assembly breaking the flow of electrical power when the vent door positioned over the vent aperture is in a closed position. Using unit 10 as an example, if vent door 82 is in the closed position, switch assembly 102 breaks the continuity of the circuit powering auxiliary fan 92. This break in continuity may be detected by controller 64, which may provide a fault indication and/or implement corrective action as described herein.

Method 200 further includes, at step 230, stopping the auxiliary fan in response to detecting an interruption in the flow of electrical power. In this manner, continuing the example from above, once controller 64 detects the switch assembly 102 has broken the electrical continuity of control circuit 100, controller 64 stops trying to provide power to auxiliary fan 92. According to one exemplary embodiment, method 200 includes, at step 240, providing an error indication to a user when the auxiliary fan is stopped in response to detecting an interruption in the flow of electrical power. For example, controller 64 can be configured for providing an indication to a user of unit 10 using display 70, or a fault condition may be communicated through one or more wired or wireless networks to, e.g., a facility operator so that corrective action may be taken.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using unit 10 as an example, it should be appreciated that this method may be applied to operate suitable air conditioner unit.

The construction of packaged terminal air conditioner unit 10, control circuit 100, and methods 200 described above provide a means for ensuring that vent door 82 is in the open position prior to operating auxiliary fan 92. More specifically, for example, if vent door 82 is stuck in the closed position, e.g., due to an electrical fault or physical obstruction, control circuit 100 stops the flow of electrical power to auxiliary fan 92. In addition, controller 64 may detect that vent door 82 is in the closed position and provide a suitable error notification. In this manner, switch assembly 102 and control circuit 100 are a low cost means for preventing excessive wear on auxiliary fan 92 and ensuring proper positioning of vent door 82. In addition, switch assembly 102 may be easily integrated into existing units 10 and may be used to provide fault indications when issues related to vent door 82 need to be addressed, thus reducing maintenance requirements and improving reliability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A packaged terminal air conditioner unit, comprising:
    a bulkhead defining an indoor portion and an outdoor portion;
    a vent aperture defined in the bulkhead;
    an auxiliary fan positioned proximate the vent aperture and being configured for urging a flow of make-up air from the outdoor portion through the vent aperture to the indoor portion;
    a vent door positioned proximate the vent aperture, the vent door being pivotable between an open position for allowing the flow of make-up air through the vent aperture and a closed position for blocking the flow of make-up air through the vent aperture;
    a switch assembly operably coupled to the vent door for detecting whether the vent door is in the open position or the closed position; and
    a controller operably coupled to the auxiliary fan and the switch assembly, the controller being configured for stopping the operation of the auxiliary fan when the switch assembly detects that the vent door is in the closed position.

2. The packaged terminal air conditioner unit of claim 1, wherein the switch assembly is a reed switch assembly comprising:
    a reed switch positioned in the bulkhead adjacent the vent aperture; and
    a magnet positioned on the vent door and configured to open the reed switch when the vent door is in the closed position.

3. The packaged terminal air conditioner unit of claim 1, wherein the switch assembly is a normally closed switch connected in series with the auxiliary fan such that the switch assembly opens and stops a flow of electrical power to the auxiliary fan when the vent door is in the closed position.

4. The packaged terminal air conditioner unit of claim 1, wherein the controller is directly coupled to the switch assembly for determining whether the vent door is in the closed position.

5. The packaged terminal air conditioner unit of claim 1, wherein the auxiliary fan is positioned within the outdoor portion adjacent the vent aperture and the vent door is positioned within the indoor portion over the vent aperture.

6. The packaged terminal air conditioner unit of claim 1, wherein the auxiliary fan is part of a sealed system configured for conditioning the flow of make-up air passing through the vent aperture.

7. The packaged terminal air conditioner unit of claim 1, wherein the controller is further configured for providing an error indication to a user when the auxiliary fan is stopped because the vent door is in the closed position.

8. The packaged terminal air conditioner unit of claim 7, wherein the error indication is provided on a display of the packaged terminal air conditioner unit.

9. The packaged terminal air conditioner unit of claim 1, wherein the controller is a dedicated make-up air module controller or a packaged terminal air conditioner unit controller.

10. A control circuit for a packaged terminal air conditioner unit, the packaged terminal conditioner unit comprising a vent door being pivotally mounted over a vent aperture defined in a bulkhead of the packaged terminal air conditioner unit and being movable between an open position and a closed position, the control circuit comprising:
    an auxiliary fan positioned proximate the vent aperture and being configured for urging a flow of make-up air from the outdoor portion through the vent aperture;
    a controller operatively connected to the auxiliary fan and configured for providing a flow of electrical power to the auxiliary fan; and
    a switch assembly connected in series between the controller and the auxiliary fan, the switch assembly comprising:
        a reed switch positioned in the bulkhead adjacent the vent aperture; and
        a magnet positioned on the vent door and configured to open the reed switch when the vent door is in the closed position to interrupt the flow of electrical power to the auxiliary fan.

11. The control circuit of claim 10, wherein the auxiliary fan is positioned within an outdoor portion adjacent the vent aperture and the vent door is positioned within an indoor portion over the vent aperture.

12. The control circuit of claim 10, wherein the auxiliary fan is part of a sealed system configured for conditioning the flow of make-up air passing through the vent aperture.

13. The control circuit of claim 10, wherein the controller is further configured for providing an error indication to a user when the auxiliary fan is stopped because the vent door is in the closed position.

14. The control circuit of claim 13, wherein the error indication is provided on a display of the packaged terminal air conditioner unit.

15. The control circuit of claim 10, wherein the controller is a dedicated make-up air module controller or a packaged terminal air conditioner unit controller.

16. A method for controlling an auxiliary fan of a packaged terminal air conditioner unit, the packaged terminal conditioner unit comprising a vent door being pivotally mounted over a vent aperture defined in a bulkhead of the packaged terminal air conditioner unit and being movable between an open position and a closed position, the method comprising:
   operating the auxiliary fan to urge a flow of make-up air through the vent aperture;
   detecting an interruption in a flow of electrical power to the auxiliary fan, the interruption resulting from a switch assembly breaking the flow of electrical power when the vent door is in the closed position; and
   stopping the auxiliary fan in response to detecting an interruption in the flow of electrical power.

17. The method of claim 16, wherein the switch assembly is a reed switch assembly comprising:
   a reed switch positioned in the bulkhead adjacent the vent aperture; and
   a magnet positioned on the vent door and configured to open the reed switch when the vent door is in the closed position.

18. The method of claim 16, further comprising:
   providing an error indication to a user when the auxiliary fan is stopped in response to detecting an interruption in the flow of electrical power.

19. The method of claim 18, wherein the error indication is provided on a display of the packaged terminal air conditioner unit.

20. The method of claim 16, wherein the method is implemented by a controller of a make-up air module or the packaged terminal air conditioner unit.

* * * * *